United States Patent [19]

Aiken et al.

[11] 4,410,499

[45] Oct. 18, 1983

[54] WASTE GAS PURIFICATION REACTOR AND METHOD

[75] Inventors: John E. Aiken, Monroeville Borough; William J. Didycz, Whitehall Borough; Donald Glassman, Mt. Lebanon Township, Allegheny County, all of Pa.

[73] Assignee: United States Steel Corporation, Pittsburgh, Pa.

[21] Appl. No.: 260,499

[22] Filed: May 4, 1981

Related U.S. Application Data

[63] Continuation-in-part of Ser. No. 35,147, May 2, 1979, abandoned.

[51] Int. Cl.³ .............................................. B01D 53/36
[52] U.S. Cl. .................................... 423/210; 423/212; 423/245; 423/247
[58] Field of Search ................ 423/210 S, 245 S, 247, 423/212 C; 422/176, 177

[56] References Cited

U.S. PATENT DOCUMENTS

| | | | |
|---|---|---|---|
| 2,327,045 | 8/1943 | Huff | 422/188 |
| 2,338,345 | 1/1944 | Mather | 422/188 |
| 2,387,026 | 10/1945 | Huntington | 422/129 |
| 2,391,315 | 12/1945 | Hulsberg | 422/180 |
| 2,409,596 | 10/1946 | Simpson et al. | 208/169 |
| 2,674,521 | 4/1954 | Houdry | 112/431 |
| 3,423,185 | 1/1969 | Ballard et al. | 422/220 |
| 3,475,133 | 10/1969 | Muller-Wartenberg | 422/169 |
| 3,479,146 | 11/1969 | Hochman | 422/220 |
| 3,502,445 | 3/1970 | Ballard et al. | 422/191 |
| 3,685,971 | 8/1972 | Carson | 422/220 |
| 3,719,457 | 3/1973 | Nagamatsu | 423/212 C |
| 3,780,772 | 12/1973 | Carnahan | 422/177 |
| 3,839,545 | 10/1974 | Schwab et al. | 423/212 C |
| 3,962,127 | 6/1976 | Woerner | 423/245 S |
| 3,964,875 | 6/1976 | Chang et al. | 422/176 |

FOREIGN PATENT DOCUMENTS 967904 8/1964 United Kingdom ............ 423/210 S

*Primary Examiner*—Earl C. Thomas
*Attorney, Agent, or Firm*—W. Gary Goodson

[57] ABSTRACT

Reactor and method for providing improved conversion of oxidizable pollutants from a waste gas stream by passing such a gas stream at a velocity of less than about 200 feet per minute through a chamber containing a thin catalyst bed capable of oxidizing the oxidizable pollutants and having a temperture rise from the inlet side to the outlet side of the bed of between about 50° C. and about 400° C. and a distributor plate located upstream and parallel to the bed. The distributor plate contains a plurality of openings such that the plate surface has a total open area of less than about 10% therein. In a preferred embodiment wherein a plurality of catalyst beds are provided, separate distributor plates are placed between the inlet for each bed and the bed itself.

13 Claims, 2 Drawing Figures

WASTE GAS PURIFICATION REACTOR AND METHOD

This is a continuation-in-part application of U.S. Ser. No. 035,147 filed May 2, 1979, now abandoned.

BACKGROUND OF THE INVENTION

1. Field of the Invention

This invention relates to air pollution control. More specifically, the invention is directed to a reactor and method for insuring oxidation of oxidizable materials in waste gas streams, and particularly by means of a waste gas purifier such as a catalytic oxidation unit. More particularly, the invention relates to a reactor and method whereby a substantially uniform flow is maintained across the surface of one or more catalyst beds.

2. Description of the Prior Art

Considerable effort has gone into removing harmful materials present in waste gas streams such as would be present in industrial plants such as those waste gases produced in the production of maleic anhydride. In developing waste gas purification units for such waste gas streams, one problem that arises is the low percent oxidation of the oxidizable components of the waste gas streams. This is particularly true in catalyst systems where it is necessary to make the catalyst beds relatively thin, such as from about 1 to 8 inches in depth, in order to prevent catalyst attrition and due to the high cost of the catalyst. Also, in some of these catalyst beds, such as those composed of oxides of manganese and copper, in order to prevent overheating of the catalyst and to minimize the energy needed to preheat, the waste gas is preheated only to the temperature needed to oxidize one of the contaminants, e.g. carbon monoxide (CO). The heat released by oxidation of the CO heats the gas to the ignition temperature of the other contaminants—hydrocarbons. Thus, the portion of the catalyst bed able to completely oxidize the hydrocarbons is small, which means that only a very thin layer of the catalyst bed is useful for conversion of hydrocarbons. If there is a disproportionately higher flow of gas to one section of a catalyst bed, the CO conversion will tend to decrease and therefore provide less heating of the gas. The lower gas temperature in turn will diminish or perhaps prevent the oxidation of hydrocarbons.

Nagamatsu, U.S. Pat. No. 3,719,457, describes a catalytic converter for purification of motor vehicle exhaust gases. This reference does teach the use of a flow control baffle to "reduce exhaust gas turbulence and velocity inequities" between the flow control baffle and the catalyst bed. However, there is no indication of a problem of uniform distribution of the exhaust gases across a "thin" catalyst bed or one with a temperature gradient across it. Furthermore, this reference requires the flow control baffle have an open area of at least 25 percent. Furthermore, the reference indicates that the spacing between the catalyst bed and the flow control baffle is not critical—since apparently the only concern of this reference is cutting down on the gas stream turbulence.

SUMMARY OF THE INVENTION

The reactor and method of this invention which overcome the above discussed and numerous other disadvantages and deficiencies of the prior art relate to a reactor for a waste gas stream containing oxidizable pollutants comprising:

(1) a chamber having an inlet for the waste gas stream on one end and an outlet on the other and in between the two outlets a thin catalyst bed for oxidizing the oxidizable pollutants from the waste gas stream, (2) a distributor plate located between the inlet and the catalyst bed and in a manner such that said waste gas stream is substantially uniformly distributed over the catalyst bed, the distributor plate having openings creating in the plate surface a total open area of less than about 10 percent, and (3) means for directing the waste gas stream through the chamber.

The waste gas stream is passed through this reactor at a velocity of less than about 200 feet per minute. Superficial velocity refers to the velocity at the face of the catalyst bed and is determined by dividing the volumetric flow by the cross-sectional area of the vessel in a substantially orthogonal direction to the direction of flow. The catalyst bed during operation has a temperature rise from the inlet side of the bed to the outlet side of between about 50° C. and about 400° C.

The inlet side of the catalyst bed is preferably located at a distance greater than about 9 inches from the outlet side of the distributor plate, and openings in the distributor plate have an average diameter of less than about 1 inch and are distributed substantially uniformly over the surface of the distributor plate. Also, the reactor preferably contains a plurality of catalyst beds with each such bed having such a distributor plate between the inlet and the catalyst bed.

In the preferred embodiment where the reactor contains a plurality of catalyst beds, it is preferred to have all of the distributor plates with substantially equal number and size of holes to help compensate for any imbalance in a catalyst bed resistance and to offer a means for gaging the relative flow to each bed.

Thus, the invention described herein makes possible the objectives of (a) substantially uniform gas flow across the face of an individual catalyst bed, (b) substantially uniform gas flow to each bed of a multiple bed arrangement, and (c) a flow measurement device because of the significant pressure drop across the distributor plate.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The waste gas stream of this invention may be any of those containing impurities which may be removed by a waste gas purification unit. However, the invention is particularly directed to those waste gas streams containing oxidizable pollutants such as hydrocarbons and carbon monoxide. Exemplary hydrocarbons found in the preferred waste gas streams are benzene, maleic acid, formic acid, and formaldehyde. One exemplary waste gas stream contains the following amounts of impurities in pounds per hour per 200,000 pounds per hour of waste gas: benzene—117, maleic acid—21, formic acid—17, formaldehyde—75, and carbon monoxide—3340.

In general, the class of pollutants may be those selected from the group $C_1$-$C_{12}$ aliphatic and aromatic hydrocarbons and partially oxygenated $C_1$-$C_{12}$ aliphatic and aromatic hydrocarbons.

A preferred waste gas stream comprises nitrogen, oxygen, carbon monoxide, carbon dioxide, and water vapor, and most preferably one wherein the nitrogen is present in said waste gas stream in an amount between about 76 and about 80 percent by volume, the oxygen is present in an amount between about 10 and about 15 percent by volume, the water vapor is present in an amount between about 5 and about 15 percent by volume, the carbon monoxide is present in an amount between about 1 and about 3 percent by volume, and the carbon dioxide is present in an amount between about 2 and about 8 percent by volume.

The waste gas purification unit of this invention is preferably a catalytic oxidation unit, and more preferably, one wherein the catalyst comprises oxides of manganese and copper. An especially preferred catalyst is a hopcalite catalyst. It is important to maintain temperature of the catalyst during use between about 120° C. and about 600° C., and preferably between about 125° C. and about 540° C. The temperature rise from the inlet to the outlet sides of the catalyst bed is preferably between about 150° C. and about 300° C.

The catalyst bed preferably has a thickness of between about 1 to 8 inches and more preferably between about 3 to 8 inches. The catalyst granules preferably have an average diameter of between about 1 and about 4 millimeters. The term granule includes pellets, particle and the like. The pressure drop from the inlet to the outlet of the catalyst bed may be between about 1 inch to about 10 inches of water; and the combined pressure drop over the distributor plate and the catalyst bed will generally be between about 2 inches and about 11 inches.

The preferred distance between the outlet side of the distributor plate and the inlet side of the catalyst bed is between about 18 inches and about 5 feet.

The velocity of the waste gas stream at the face of the bed is preferably between about 60 and about 140 feet per minute.

Figure 1:
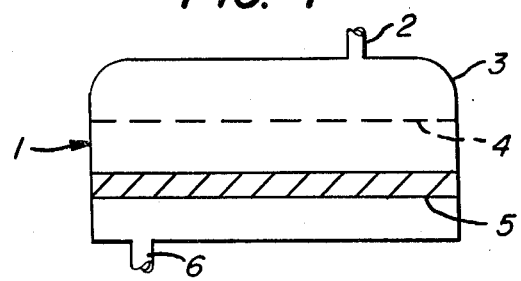
FIG. 1 is a schematic representation of the waste gas purification reactor and method of this invention.

In FIG. 1 a waste gas stream containing oxidizable impurities enters reactor 1 through inlet 2 of chamber 3. The gas stream then passes through distributor plate 4 where it undergoes a pressure drop sufficient to cause the gas stream to be substantially uniformly distributed over the catalyst bed, and wherein the distributor plate openings create in the plate surface a total open area of less than about 10 percent. The gas stream then passes through catalyst bed 5 and then leaves through outlet 6.

Figure 2:
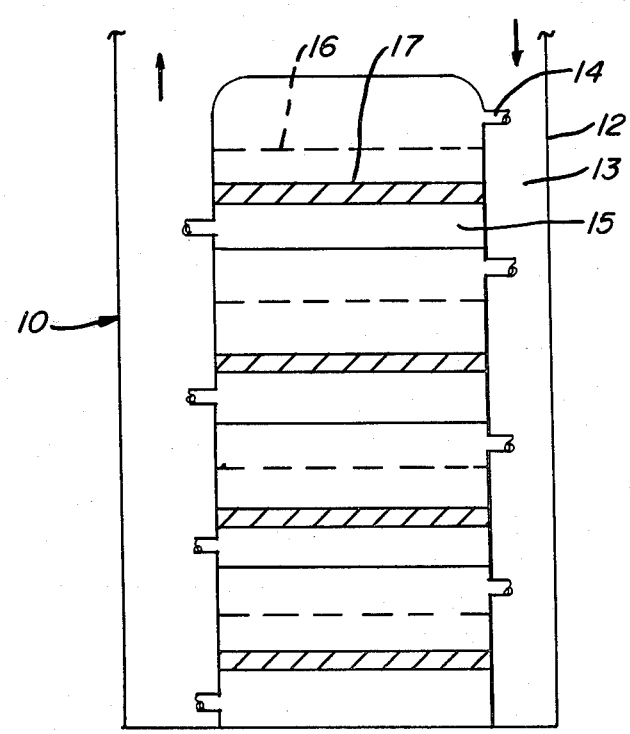
FIG. 2 is a schematic representation of a preferred waste gas purification reactor and method comprising a plurality of catalyst beds and corresponding distributor plates.

In FIG. 2 reactor 10 comprises a plurality of horizontal parallel catalyst beds with corresponding distributor plates. The outlet reactor wall 12 helps provide means 13 for allowing the waste gas stream to communicate with the different inlets 14 of the chambers 15 containing distributor plates 16 and corresponding catalyst beds 17. The operation of the multiple unit reactor of FIG. 2 is essentially the same as that of FIG. 1.

By way of example, a 6-stage reactor having a configuration essentially of the 4-stage reactor 10 of FIG. 2 except for the extra 2 stages was used to practice the subject invention. The height of each stage was 8 ft. 6 in. The reactor 10 had an inside diameter of 15 ft. 5 in., the catalyst bed 17 and the distributor plate 16 were washer shaped with the means 13 for allowing the waste gas stream to communicate with the various inlets 14 being in the form of a 4 ft. (outside) diameter internal pipe down the center of the washer-shaped catalyst bed. The distributor plate 16 had $\frac{1}{4}$" diameter openings being uniformly distributed across the plate surface to provide an opening area of 1.26% of the plate surface. The distributor plate 16 was located 4 ft. 2 in. from the top of catalyst bed 17, which was a granular hopcalite catalyst having an average particle size of about 2 mm.

The waste gas stream entering means 13 was composed primarily of nitrogen and oxygen with minor amounts of oxidizable pollutants in the form of carbon monoxide and hydrocarbons. Benzene was the major component of the hydrocarbons. The flow rate of gas coming into the reactor 10 was 42,300 scfm. Means 13 in combination with the distributor plates 16 result in essential equal distribution of the gas stream to the outlets 14 of the 6 stages. The inlet temperature to each catalyst bed 17 was about 140° C. and the outlet temperature leaving the reactor 10 was about 393° C. The pressure at the inlet side of distributor plate 16 was 11.5 in. of water. The pressure drop from the inlet to the outlet side of the distributor plate 16 was 1.4 in. of water and the pressure drop from the inlet to the outlet side of the catalyst bed 17 was 1.5 in. of water.

The total heat release capability of the gas stream entering the reactor 10 was equivalent to 3.0 volume % of carbon monoxide, 2.0 volume % of this 3.0% being due to actual carbon monoxide. This incoming gas stream also contained hydrocarbons in an amount of 3650 ppm by volume expressed as methane. The gas stream leaving the reactor 10 contained 0.05 volume % of carbon monoxide and 250 ppm by volume of hydrocarbons expressed as methane. Thus, the hydrocarbon conversion was about 93% complete and the carbon monoxide conversion was about 98% complete. A Beckman Flame Ionization Hydrocarbon Analyzer was used to measure the hydrocarbons.

The catalyst bed 17 of this reactor 10 of this example was operated substantially continuously for about 16 months. At this time, about 5% by weight additional catalyst was added to eliminate some non-uniformity that has occurred in the catalyst bed thickness. However, even up to the time of the catalyst addition, the reactor was operating satisfactorily as indicated by an 85% or greater conversion of the hydrocarbon present in the gas stream. Since the addition of the additional catalyst, the bed has been continued in operation for about 12 months. The reactor was still operating satisfactorily at this time as indicated by the 85% or greater conversion of the hydrocarbons in the gas stream.

The only significant change in the operation of the catalyst bed during the approximate 28 months of essentially continuous operation is that the temperature to which the gas stream must be preheated to achieve the 85% conversion of hydrocarbons has risen from 120° C. to about 160° C. and about 200° C. Calculations indicate that the preheat temperature can go to at least about 250° C. Therefore, it is currently estimated that considerable life still remains with the aforementioned catalyst bed.

This extended catalyst life while still obtaining the desired 85% hydrocarbon conversion is quite unexpected since prior art Hopcalite catalyst systems required large addition, between 10 and 30 percent, of catalyst every 12 months. This prior art system would preheat the Hopcalite bed to about 350° C. immediately prior to passing the gas stream through the bed and achieve a 30° C. temperature rise across the bed.

It would not use a distributor plate such as used in the invention of this application. This invention preferably preheats to about 170° C., with a corresponding temperature rise of about 220° C. through the bed. Heat generated by oxidizing the carbon monoxide present in the gas stream accounts for the high temperature rise across the catalyst bed. This would suggest that gas-flow distribution would be even more critical in the system of this invention as compared to the prior art system; because, in the system of the invention, most of the heat needed to reach the required conversion temperature is generated within the bed and not provided prior to the bed as is typical in other uses of this catalyst.

We claim:

1. Process for removing oxidizable pollutants from a waste gas stream, comprising:
    (1) introducing said waste gas stream through an inlet into a chamber containing a thin catalyst bed for oxidizing said pollutants, and wherein the superficial gas velocity is less than about 200 feet per minute, and wherein said waste gas stream is introduced into said chamber at a temperature sufficient to oxidize only a portion of the contaminants present in said waste gas stream, thereby heating the gas stream to the ignition temperature of the other contaminants therein;
    (2) passing said waste gas stream through a distributor plate containing a plurality of openings extending therethrough located between said inlet and said catalyst bed in a manner such that said waste gas stream is substantially uniformly distributed over said catalyst bed, said distributor plate having openings creating in said plate surface a total open area of less than about 10 percent;
    (3) passing said waste gas through said catalyst bed while maintaining said catalyst bed at a temperature sufficient to sustain catalytic oxidation of said oxidizable pollutants; and said catalyst bed having a temperature rise from the inlet side of said bed to the outlet side of between about 50° C. and about 400° C.; and wherein said catalyst bed has a thickness of less than about 8 inches; and
    (4) withdrawing through in outlet of said chamber said waste gas stream which has passed through said catalyst bed.

2. Process as in claim 1 wherein said catalyst bed is located in a substantially horizontal plane and said distributor plate is located in a plane above and substantially parallel thereto.

3. Process as in claim 2 wherein the distance between the outlet side of said distributor plate and the inlet side of said catalyst bed is greater than about 9 inches.

4. Process as in claim 2 wherein the pressure drop from the inlet side of said distributor plate to the outlet side is between about 1 inch to about 4 inches of water pressure drop, the distance between the outlet side of said distributor plate and the inlet side of said catalyst bed is between about 18 inches and about 5 feet.

5. Process as in claim 4 wherein the openings in said distributor plate have an average diameter of less than about 1 inch.

6. Process as in claim 4 wherein the pollutants are selected from the group $C_1$–$C_{12}$ aliphatic and aromatic hydrocarbons, partially oxygenated $C_1$–$C_{12}$ aliphatic and aromatic hydrocarbons, and carbon monoxide.

7. Process of claim 6 wherein the catalyst of said catalyst bed comprises oxides of manganese and copper.

8. Process as in claim 4 wherein said inlet is above said catalyst bed and wherein said catalyst bed is in a substantially horizontal layer having a thickness of between about 3 inches and about 8 inches.

9. Process as in claim 1 wherein said plurality of openings have an average diameter of less than about $\frac{1}{4}$ inch.

10. Process for treating a waste gas stream containing oxidizable pollutants comprising benzene, maleic acid, formic acid, formaldehyde, carbon monoxide, or mixtures thereof, and which process comprises:
    (1) introducing said waste gas stream at a temperature sufficient to oxidize only a portion of the contaminants present in said waste gas stream, thereby heating the gas stream to the ignition temperature of the remaining portion of the contaminants therein; and at a velocity of less than about 200 feet per minute through inlets into a plurality of chambers, each containing a thin, granular catalyst bed having a thickness of less than about 8 inches for oxidizing said pollutants.
    (2) passing said waste gas stream downward through a plurality of distributor plates, each containing a plurality of openings having an average diameter of less than about 1 inch, said openings creating in each of said plates a total open area of less than about 5 percent, and each of said plates being located below the respective inlet and above each of the respective catalyst beds in a manner such that said waste gas stream is substantially uniformly distributed over each of said catalyst beds;
    (3) passing said waste gas downward through each of said catalyst beds while maintaining each of said catalyst beds at a temperature of between about 140° C. and about 540° C. sufficient to sustain catalytic oxidation of said oxidizable pollutants and each of said catalyst beds having a temperature rise from the inlet side of each of said beds to the outlet side of between about 50° C. and about 400° C., and
    (4) withdrawing through an outlet for each of said chambers for said waste gas stream which has passed through each of said catalyst beds, and wherein each of said catalyst beds is substantially parallel to the other catalyst beds.

11. Process of claim 10 wherein the back pressure provided at each distributor plate is substantially uniform which thereby causes substantially equal distribution of said waste gas stream to each said catalyst bed.

12. Process of claim 11 wherein each of said catalyst beds is in a substantially horizontal layer having a thickness of between about 4 inches and about 8 inches.

13. Process as in claim 10 wherein the pressure drop from the inlet side of each of said distribution plates to the outlet side is between about 1 inch to about 4 inches of water pressure drop, wherein the distance between the outlet side of each of said distributor plates and the inlet side of each of the respective catalyst beds is between about 18 inches and about 5 feet, and wherein the velocity of said waste gas stream at the inlet of each of said chambers is between about 60 and about 140 feet per minute.

* * * * *